UNITED STATES PATENT OFFICE.

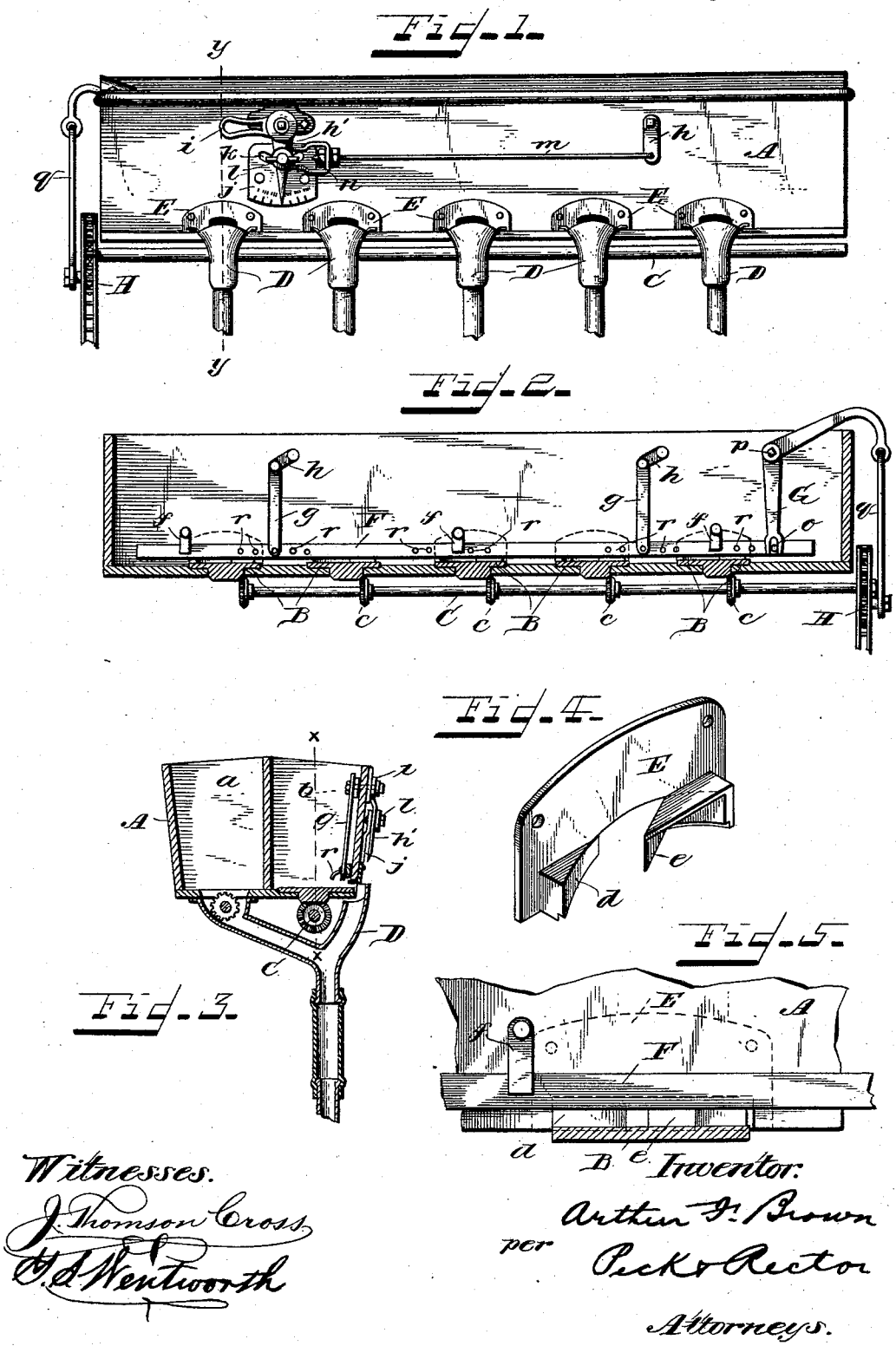

ARTHUR F. BROWN, OF DAYTON, OHIO, ASSIGNOR TO THE STODDARD MANUFACTURING COMPANY, OF SAME PLACE.

FERTILIZER ATTACHMENT FOR SEEDING-MACHINES.

SPECIFICATION forming part of Letters Patent No. 455,469, dated July 7, 1891.

Application filed November 19, 1890. Serial No. 371,962. (No model.)

*To all whom it may concern:*

Be it known that I, ARTHUR F. BROWN, a citizen of the United States, residing at Dayton, in the county of Montgomery and State of Ohio, have invented certain new and useful Improvements in Fertilizer Attachments for Grain-Drills or Harrows, of which the following is a full, clear, and exact description, reference being had to the accompanying drawings, forming part of this specification.

My invention relates to fertilizer attachments for grain-drills, harrows, or other agricultural implements, and has for its object the improved construction of such attachments, whereby the feed is regulated, adjusted, and made certain.

The novelty will be hereinafter set forth, and specifically pointed out in the claims.

In the accompanying drawings, Figure 1 is an elevation of a hopper embodying my invention. Fig. 2 is a longitudinal sectional view through the dotted line *x x* of Fig. 3, looking to the right. Fig. 3 is a transverse section through the dotted line *y y* of Fig. 1. Fig. 4 is an enlarged perspective of one of the discharge-throats. Fig. 5 is an enlarged detail elevation of the inside of the hopper at one of the discharge-throats.

The same letters of reference are used to indicate identical parts in all the figures.

A is the usual hopper, in this instance divided longitudinally or made double to afford on one side *a*, Fig. 3, a receptacle for grain and on the other *b* a receptacle for the fertilizer compound.

B are the usual feed-disks for the fertilizer, resting in the bottom of the hopper and driven from a shaft C by means of the beveled gears *c*, as usual in this class of attachments. Each feed-wheel extends under an opening or discharge-throat at the lower edge of the hopper for delivering the fertilizer into the upper end of the usual spouts D, and to form each of these throats I provide the metal plate E, secured to the outside of the hopper at its lower edge, and having upon its inner side the projection or lug *d*, forming one side wall of the throat, and the oblique scraper *e*, forming the opposite side wall.

The feed-disk revolves under the scraper *c*, whose lower edge rests upon it, and the fertilizer carried by the disk is forced by the scraper into the spout D, as usual in this class of attachments. Hung within the hopper by pivoted arms *g*, pivoted at their upper ends to double crank-arms *h*, is a flat bar F, which, when the crank-arms *h* and arms *g* are lowered, completely closes all of the discharge-openings. This bar or gate is bodily and vertically adjustable behind stationary lugs *f* to regulate the size of the discharge-openings by means of the arms *g*, Fig. 2, pivoted at their lower ends to the gate and at their upper ends to double crank-arms *h*, journaled through the hopper. On the outside of the hopper of one of these crank-arms H' is an index-pointer provided with an operating-handle *i* and arranged over an index-plate *j*, having a segmental slot *k* for the passage of a locking-bolt *l*, inserted through the pointer and for locking the same in any of its adjusted positions. Connecting the pointer *h'* and the crank-arm *h*, on the outside of the hopper, is a rod *m*, preferably adjustable by means of the nuts *n n*.

It will be seen from the above description that by turning the handle *i* or moving the pointer *h'* both the arms *g* are simultaneously raised or lowered to raise or lower the gate F, and thereby regulate the size of all of the discharge-openings. In addition to this vertical bodily adjustment of the gate F, it is given by the forward motion of the machine a longitudinal reciprocation for the purpose of agitating the fertilizer to prevent its clogging, in the following manner.

A bell-crank lever G, having its lower end forked and engaging a pin *o* on the gate F, near one end, is pivoted, as at *p*, to the inside of the hopper. Its other end projects over the end of the hopper and is bent down and connected by a pitman *q* with a wrist-pin upon the drive-wheel H—in this instance a sprocket-wheel upon the end of the shaft C, so that the revolution of said wheel and shaft imparts a longitudinal reciprocation to the gate, as will be readily understood.

To aid in agitating the fertilizer and to prevent its clogging, I apply pins or fingers $r$ to the side of the gate, which, by the reciprocation of the latter, act as stirrers.

Having thus fully described my invention, I claim—

1. In a fertilizer attachment, the combination, with the feed-disks and the discharge-openings for the same, of a vertically-adjustable and longitudinally-reciprocating gate for regulating the size of said openings and serving as an agitator for the fertilizer.

2. In a fertilizer attachment, the combination, with the feed-disks and the discharge-openings for the same, of a vertically-adjustable and longitudinally-reciprocating gate provided with fingers for regulating the size of said openings and serving as an agitator for the fertilizer.

3. In a fertilizer attachment, the combination, with the feed-disks and their discharge-openings, of the gate F, having fingers $r$ and hung and made vertically adjustable by the arms $g$, cranks $h$, and rod $m$, substantially as described.

4. In a fertilizer attachment, the combination, with the feed-disks and their discharge-openings, of the gate F, having fingers $r$ and hung by arms $g$, and the bell-crank G, connected at one end to the gate and at the other end to a wrist-pin upon a revolving part of the machine, substantially as described.

ARTHUR F. BROWN.

Witnesses:
WARREN HALL,
H. A. CRANDALL.